(12) United States Patent
Oyman

(10) Patent No.: US 10,433,327 B2
(45) Date of Patent: Oct. 1, 2019

(54) PRESENCE SERVICE USING IMS BASED DASH SERVICE

(71) Applicant: INTEL IP CORPORATION, Santa Clara, CA (US)

(72) Inventor: Ozgur Oyman, Palo Alto, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 38 days.

(21) Appl. No.: 15/725,205

(22) Filed: Oct. 4, 2017

(65) Prior Publication Data

US 2018/0035450 A1 Feb. 1, 2018

Related U.S. Application Data

(63) Continuation of application No. 14/653,455, filed as application No. PCT/US2013/077745 on Dec. 26, 2013, now Pat. No. 9,801,054.
(Continued)

(51) Int. Cl.
*H04L 29/06* (2006.01)
*H04W 72/12* (2009.01)
(Continued)

(52) U.S. Cl.
CPC ...... *H04W 72/1263* (2013.01); *H04B 7/0417* (2013.01); *H04B 7/0456* (2013.01); *H04J 3/00* (2013.01); *H04L 1/1812* (2013.01); *H04L 1/1887* (2013.01); *H04L 5/0051* (2013.01); *H04L 5/0055* (2013.01); *H04L 5/0057* (2013.01); *H04L 5/0062* (2013.01); *H04L 5/0092* (2013.01); *H04L 5/0096* (2013.01);
(Continued)

(58) Field of Classification Search
CPC .. H04W 72/1263; H04W 88/06; H04L 5/009; H04L 5/22
USPC .......................................................... 709/219
See application file for complete search history.

(56) References Cited

U.S. PATENT DOCUMENTS

2008/0077696 A1 3/2008 Nguyen et al.
2010/0011063 A1 1/2010 Blaiotta et al.
(Continued)

FOREIGN PATENT DOCUMENTS

CN 1794706 A 6/2006
CN 101127951 A 2/2008
(Continued)

OTHER PUBLICATIONS

ISO/IEC 23009-1: Information technology—Dynamic adaptive streaming over HTTP (DASH)—Part 1: Media presentation description and segment formats; Jan. 5, 2012.
(Continued)

*Primary Examiner* — Glenford J Madamba
(74) *Attorney, Agent, or Firm* — Thorpe North & Western

(57) ABSTRACT

Technology for distributing presence information by a presence server in an Internet protocol (IP) multimedia subsystem (IMS) based dynamic adaptive streaming over hypertext transfer protocol (HTTP) (DASH) service is disclosed. In an example, a user equipment (UE) can be operable to act as a presentity and include computer circuitry configured to: Generate a trigger event during a DASH session; and publish presence information including content being consumed to a presence server. The published content can include DASH content.

18 Claims, 8 Drawing Sheets

Related U.S. Application Data

(60) Provisional application No. 61/753,914, filed on Jan. 17, 2013.

(51) Int. Cl.

| | | |
|---|---|---|
| *H04W 16/32* | (2009.01) | |
| *H04W 56/00* | (2009.01) | |
| *H04L 5/22* | (2006.01) | |
| *H04J 3/00* | (2006.01) | |
| *H04W 28/02* | (2009.01) | |
| *H04W 76/27* | (2018.01) | |
| *H04W 76/11* | (2018.01) | |
| *H04W 52/02* | (2009.01) | |
| *H04W 12/04* | (2009.01) | |
| *H04W 84/12* | (2009.01) | |
| *H04W 88/06* | (2009.01) | |
| *H04L 5/00* | (2006.01) | |
| *H04W 48/10* | (2009.01) | |
| *H04W 76/28* | (2018.01) | |
| *H04W 76/14* | (2018.01) | |
| *H04B 7/0417* | (2017.01) | |
| *H04B 7/0456* | (2017.01) | |
| *H04L 1/18* | (2006.01) | |
| *H04L 5/14* | (2006.01) | |
| *H04L 9/14* | (2006.01) | |
| *H04L 12/26* | (2006.01) | |
| *H04L 29/08* | (2006.01) | |
| *H04W 4/06* | (2009.01) | |
| *H04W 8/00* | (2009.01) | |
| *H04W 36/22* | (2009.01) | |
| *H04W 48/08* | (2009.01) | |
| *H04W 48/20* | (2009.01) | |
| *H04W 68/02* | (2009.01) | |
| *H04W 72/00* | (2009.01) | |
| *H04W 72/02* | (2009.01) | |
| *H04W 72/04* | (2009.01) | |
| *H04W 74/00* | (2009.01) | |
| *H04W 24/02* | (2009.01) | |
| *H04W 24/10* | (2009.01) | |
| *H04W 48/16* | (2009.01) | |
| *H04W 12/02* | (2009.01) | |
| *H04W 36/00* | (2009.01) | |

(52) U.S. Cl.
CPC .............. *H04L 5/14* (2013.01); *H04L 5/1469* (2013.01); *H04L 5/22* (2013.01); *H04L 9/14* (2013.01); *H04L 43/08* (2013.01); *H04L 63/0428* (2013.01); *H04L 63/30* (2013.01); *H04L 65/1006* (2013.01); *H04L 65/4076* (2013.01); *H04L 65/602* (2013.01); *H04L 65/608* (2013.01); *H04L 65/80* (2013.01); *H04L 67/02* (2013.01); *H04W 4/06* (2013.01); *H04W 8/005* (2013.01); *H04W 12/02* (2013.01); *H04W 12/04* (2013.01); *H04W 16/32* (2013.01); *H04W 24/02* (2013.01); *H04W 24/10* (2013.01); *H04W 28/0231* (2013.01); *H04W 36/0066* (2013.01); *H04W 36/0069* (2018.08); *H04W 36/22* (2013.01); *H04W 48/08* (2013.01); *H04W 48/10* (2013.01); *H04W 48/16* (2013.01); *H04W 48/20* (2013.01); *H04W 52/0251* (2013.01); *H04W 56/001* (2013.01); *H04W 68/02* (2013.01); *H04W 72/00* (2013.01); *H04W 72/02* (2013.01); *H04W 72/042* (2013.01); *H04W 72/046* (2013.01); *H04W 72/0406* (2013.01); *H04W 72/0413* (2013.01); *H04W 72/0446* (2013.01); *H04W 72/12* (2013.01); *H04W 72/1205* (2013.01); *H04W 72/1278* (2013.01); *H04W 74/00* (2013.01); *H04W 76/11* (2018.02); *H04W 76/14* (2018.02); *H04W 76/27* (2018.02); *H04W 76/28* (2018.02); *H04W 84/12* (2013.01); *H04W 88/06* (2013.01); *H04L 5/0035* (2013.01); *H04L 5/0094* (2013.01); *H04L 2209/24* (2013.01); *H04L 2209/80* (2013.01); *Y02B 70/32* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/22* (2018.01); *Y02D 70/23* (2018.01); *Y02D 70/24* (2018.01); *Y02D 70/25* (2018.01)

(56) References Cited

U.S. PATENT DOCUMENTS

| | | |
|---|---|---|
| 2011/0004942 A1 | 1/2011 | Boberg et al. |
| 2011/0289195 A1 | 11/2011 | Lindgren et al. |
| 2012/0110120 A1 | 5/2012 | Willing et al. |
| 2012/0259946 A1 | 10/2012 | Stockhammer et al. |
| 2013/0036234 A1 | 2/2013 | Pazos et al. |
| 2013/0107786 A1* | 5/2013 | Lotfallah ............ H04L 65/1016 370/312 |

FOREIGN PATENT DOCUMENTS

| | | |
|---|---|---|
| CN | 101371595 A | 2/2009 |
| CN | 102165718 A | 8/2011 |
| EP | 1909411 A1 | 4/2008 |
| JP | 2014/500998 A | 1/2014 |
| JP | 2014/515144 A | 6/2014 |
| KR | 10-2010/00056686 A | 5/2010 |
| KR | 10-2011/0066356 A | 6/2011 |
| WO | WO2009/097902 A1 | 8/2009 |
| WO | WO 2012/138895 A1 | 10/2012 |
| WO | WO 2013/003793 A1 | 1/2013 |

OTHER PUBLICATIONS

ISR for PCT/US2013/07745 dated Apr. 4, 2014.
3GPP TS 24.141 V11.0.0; Presence service using the IP Multimedia (IM) Core Network (CN) subsystem; Stage 3; (Release 11) (Sep. 2012).
3GPP TS 24.247 V11.2.0; Messaging service using the IP Multimedia (IM) Core Network (CN) subsystem; Stage 3; (Release 11) (Dec. 2012).
3GPP TS 26.237 V10.6.0; IP Multimedia Subsystem (IMS) based Packet Switch Streaming (PSS) and Multimedia Broadcast/Multicast Service (MBMS) User Service; Protocols (Release 10) (Dec. 2012).
3GPP TS 26.346 V11.3.0; Multimedia Broadcast/Multicast Service (MBMS); Protocols and codecs (Release 11) (Dec. 2012).
OMA Management Object for SIMPLE Presence; OMA-TS-Presence_SIMPLE_MO-V1_0-20060725-A; Jul. 25, 2006.
Supplementary ESR for EP 13 87 1686 dated Jun. 28, 2016.

* cited by examiner

PRESENCE SERVICE USING IMS BASED DASH SERVICE

RELATED APPLICATIONS

This application is a continuation of U.S. patent application Ser. No. 14/653,455 filed Jun. 18, 2015 which is a 371 nationalization of PCT/US2013/077745 filed Dec. 26, 2013 which claims the benefit of and hereby incorporates by reference U.S. Provisional Patent Application Ser. No. 61/753,914, filed Jan. 17, 2013.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

The wireless device can be used receive multimedia delivery of Internet video using various protocols, such as hypertext transfer protocol (HTTP) streaming. A protocol to provide HTTP-based delivery of video streaming can include dynamic adaptive streaming over HTTP (DASH).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
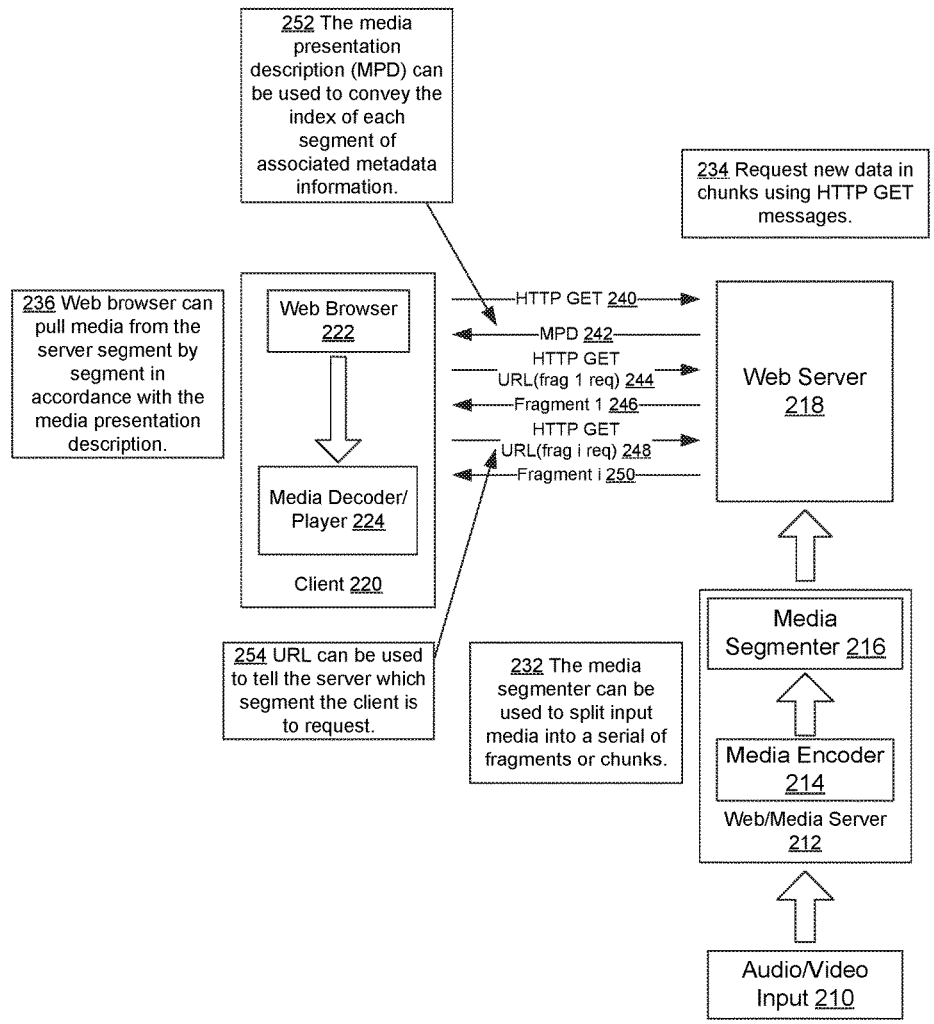
FIG. 1 illustrates a block diagram at a client and servers for dynamic adaptive streaming over hypertext transfer protocol (HTTP) (DASH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Presence services can be part of the rich communication services (RCS) profiles developed by global system for mobile communications (GSM) association (GSMA) to support multimedia services over the Internet protocol (IP) multimedia subsystem (IMS). Presence services can allow a user to share presence information, such as geolocation, service capabilities, content consumption, taglines, and avatars. A user's client application can provide presence information (e.g., presence state) to a presence service (e.g., via a presence server), which presence information can be stored in a personal availability record (referred to as a presentity) and can be made available for distribution to other users (referred to as watchers) to convey the presentity user's availability for communication. The presence server can accept, store, publish, and distribute presence information. IMS presence can be implemented using a session initiation protocol (SIP) and extensible markup language (XML) configuration access protocol (XCAP) as defined by the Internet engineering task force (IETF) and 3GPP, with logical network elements defined by the open mobile alliance (OMA). In the 3GPP context, the architecture and functional description of the presence services can be specified in 3GPP technical specification (TS) 24.141 V11.0.0 (2012-09). The protocol for the presence services, including end-user applications, can be specified by OMA in Presence SIP Instant Message and Presence Leveraging Extensions (SIMPLE) Specification Version 1.0 (25 Jul. 2006 OMA-TS-Presence_SIMPLE-V1_0-20060725-A).

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

Dynamic adaptive streaming over HTTP (DASH) can be a standardized HTTP streaming protocol. In an example, DASH can be standardized in 3GPP technical specification (TS) 26.247 V11.1.0 (2012-12). In DASH, a media presentation description (MPD) metadata file can provide information on the structure and different versions of the media content representations stored in the server including different bitrates, frame rates, resolutions, or codec types. In addition, DASH can also specify segment formats. The MPD metadata file can contain information on the initialization and media segments for a media player (e.g., the media player can look at initialization segment to determine a container format and media timing information) to ensure mapping of segments into a media presentation timeline for switching and synchronous presentation with other representations. Based on this MPD metadata information that describes the relation of the segments in forming a media presentation, clients (or client devices) can request the segments using HTTP GET or partial GET methods. The client can fully control the streaming session. For example, the client can manage an on-time request and smooth playout of the sequence of segments, and potentially adjusting bitrates or other attributes (e.g., to react to changes of the device state or the user preferences). DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the available bandwidth changes. Thus, DASH can allow for fast adaptation to changing network and wireless link conditions, user preferences and device capabilities, such as a display resolution, the type of central processing unit (CPU) employed, or memory resources available, and so forth.

In DASH, a media presentation description (MPD) metadata file can provide information on the structure and different versions of the media content representations stored in a web and/or media server 212, as illustrated in FIG. 1. The different versions of the media content representations can include different bitrates, frame rates, resolutions, codec types, or other similar types of information. In addition, DASH can also specify the segment formats, which can contain information on initialization and media segments for a media engine to ensure mapping of segments into a media presentation timeline for switching and synchronous presentation with other representations. Based on the MPD metadata information, which describes the relationship of the segments and how the segments form a media presentation, a client 220 can request the segments using an HTTP GET 240 message or a series of partial GET messages. The client can control the streaming session, such as managing an on-time request and smooth playout of a sequence of segments, or potentially adjusting bitrates or other attributes, to react to changes of a device state or a user preference.

FIG. 1 illustrates a DASH-based streaming framework. A media encoder 214 in the web/media server 212 can encode an input media from an audio/video input 210 into a format for storage or streaming. A media segmenter 216 can be used to split the input media into a serial of fragments or chunks 232, which can be provided to a web server 218. The client 220 can request new data in chunks using HTTP GET 220 messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations, as shown in the associated metadata information 252. The web browser can pull media from the server segment by segment in accordance with the MPD 242 as shown in 236. For instance, the web browser can request a first fragment using a HTTP GET URL(frag 1 req) 244. A uniform resource locator (URL) or universal resource locator can be used to tell the web server which segment the client is to request 254. The web server can provide the first fragment (i.e., fragment 1 246). For subsequent fragments, the web browser can request a fragment i using a HTTP GET URL(frag i req) 248, where i is an integer index of the fragment. As a result, the web server can provide a fragment i 250. The fragments can be presented to the client via a media decoder and/or player 224.

Figure 2:
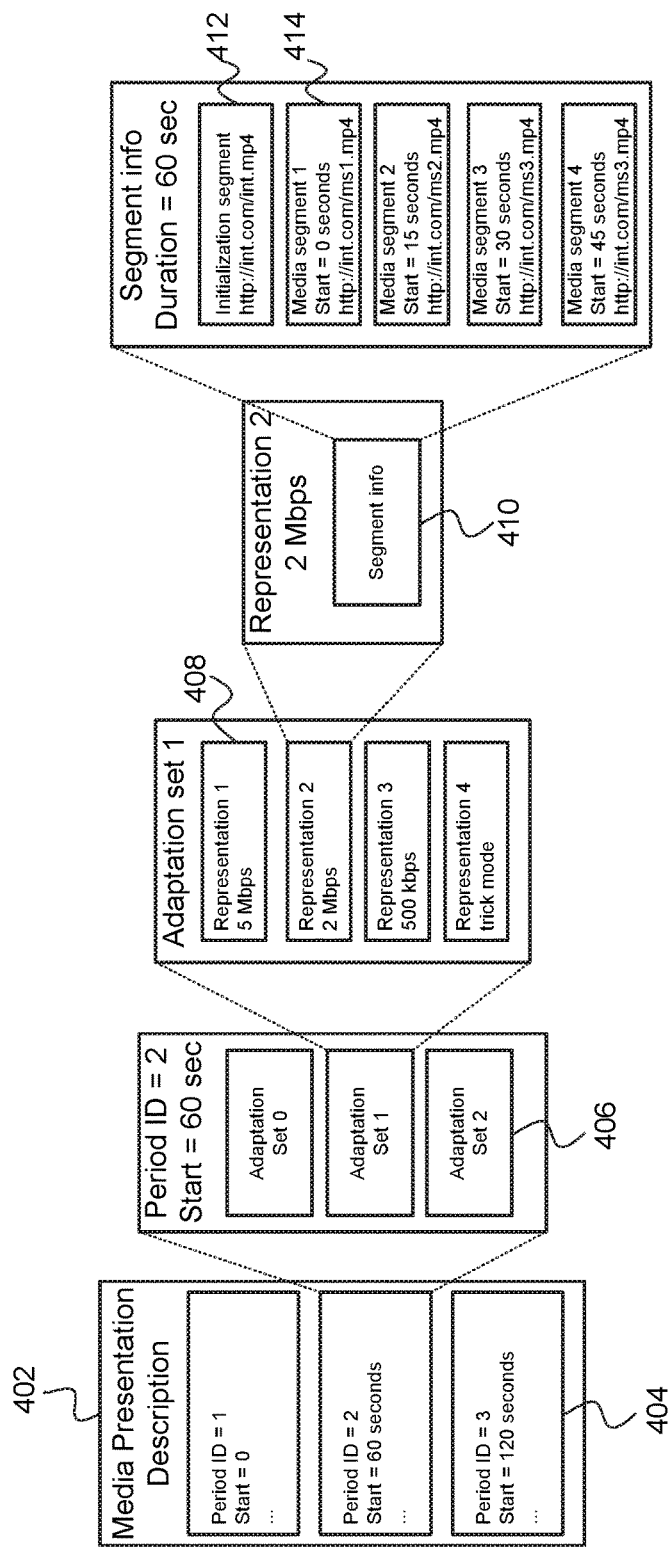
FIG. 2 illustrates a block diagram of a media presentation description (MPD) metadata file configuration in accordance with an example.

As illustrated in FIG. 2, DASH can specify different formats for a media presentation description (MPD) metadata file 402 that provides information on the structure and different versions of the media content representations stored in the server as well as the segment formats (or fragment formats). In DASH, a media presentation description (MPD) metadata 402 can provide information on the structure and different versions of the media content representations stored in a web and/or media server. In the example illustrated in FIG. 2, the MPD metadata can be temporally divided into periods 404 having a predetermined length, such as 60 seconds in this example. Each period can include a plurality of adaptation sets 406. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set may also include audio in different languages. The different alternatives offered in the adaptation set can be referred to as representations 408.

In FIG. 2, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video may also be available in different formats, such as two dimensional (2D) or three dimensional (3D) video, or portrait or landscape oriented video. Each representation 408 can include segment information 410. The segment information can include initialization information 412 and the actual media segment data 414. In this example, an MPEG-4 (MP4) file is streamed from a server to a mobile device. While MP4 is used in this example, a wide variety of different codecs may be used. A codec is a device, application, element, or computer program capable of encoding or decoding a digital data stream or signal.

The multimedia in the adaptation set can be further divided into smaller segments. In the example of FIG. 2, the 60 second video segment of adaptation set 1 is further divided into four sub-segments 414 of 15 seconds each. These examples are not intended to be limiting. The actual length of the adaptation set and each media segment or sub-segment is dependent on the type of media, system requirements, potential types of interference, and so forth. The actual media segments or sub-segments may have a length that is less than one second to several minutes long.

DASH content can be distributed using multimedia broadcast multicast services (MBMS). MBMS is a point-to-multipoint interface specification for cellular networks, which can provide efficient delivery of broadcast and multicast services, both within a cell as well as within a core network. Enhanced multimedia broadcast and multicast services (eMBMS) can be an LTE version of MBMS, which may be deployed on LTE networks. LTE's eMBMS can provide transport features for sending a same content information to all the users in a cell (i.e., broadcast) or to a given set of users (subscribers) in a cell (i.e., multicast) using a subset of the available radio resources while the remaining available radio resources can be used to support transmissions towards a particular user (e.g., unicast services).

Deployments of eMBMS can enhance the performance and usability of core MBMS user service features. MBMS download delivery can be a service alternative for offloading HTTP-based unicast download delivery. Benefits can include enabling support for non-real-time service types, provisioning of contents that complement MBMS streaming services, and leveraging the increasing storage capacity on devices (e.g., servers). The DASH segment format, which can also be used for unicast transport with HTTP, can be agnostic of the delivery environment being unicast or multicast. The MBMS user service specification (e.g., 3GPP TS 26.346 V11.3.0 (2012 December)) may allow DASH-formatted content to be transmitted using MBMS download delivery with the FLUTE protocol.

FLUTE can be a protocol for the unidirectional delivery of files over the Internet, which can be particularly suited to multicast networks. FLUTE can build on asynchronous layered coding (ALC), a base protocol designed for massively scalable multicast distribution. FLUTE can provide instantiation of a layered coding transport (LCT) building block. The ALC protocol can combine the LCT building block, a congestion control (CC) building block and a forward error correction (FEC) building block to provide congestion controlled reliable asynchronous delivery. The LCT can provide transport level support for reliable content delivery and stream delivery protocols. Streaming data or downloads can be encapsulated in real-time transport protocol (RTP) and transported using the FLUTE protocol when delivering over MBMS bearers. RTP can be used in communication and entertainment systems that involve streaming media, such as telephony, video teleconference applications, television services and web-based push-to-talk features.

Figure 3:
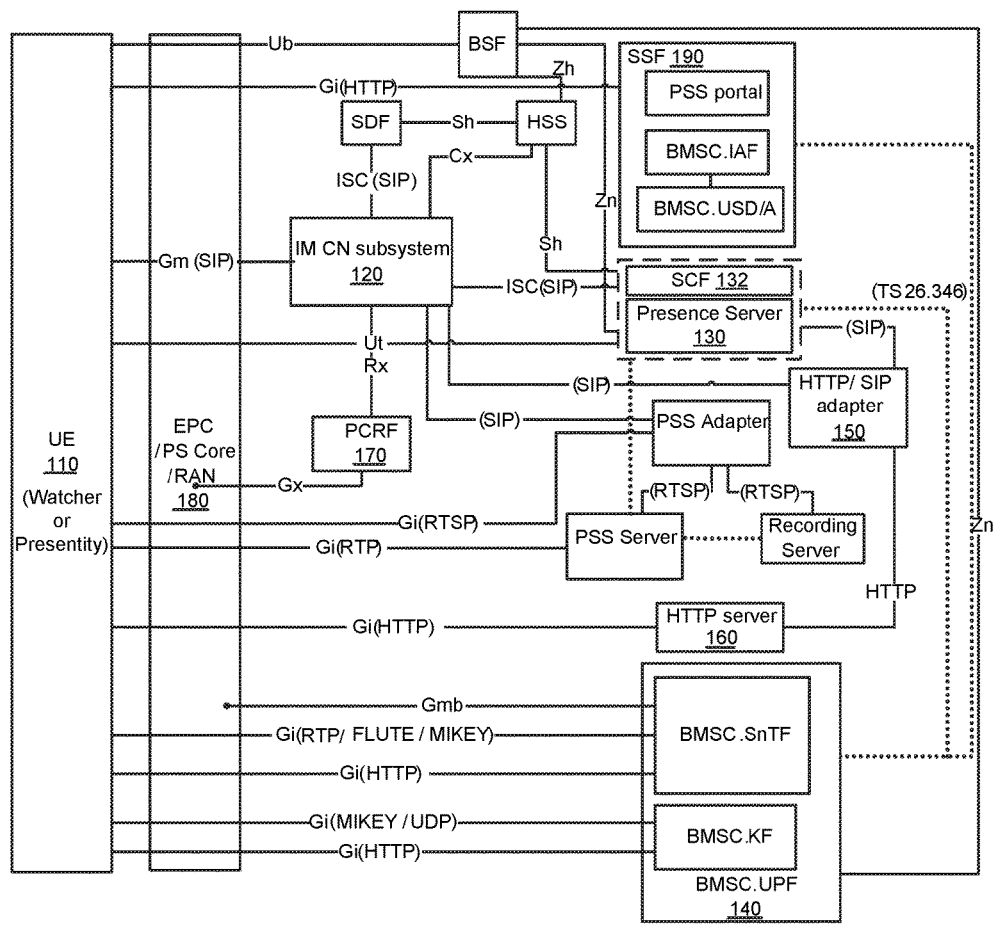
FIG. 3 illustrates a block diagram of an Internet protocol (IP) multimedia subsystem (IMS) based packet-switched streaming services (PSS) and multimedia broadcast multicast services (MBMS) functional architecture with a presence server in accordance with an example.

A presence server 130 for an IMS based DASH service may be implemented in an IMS based packet-switched streaming services (PSS) and MBMS user service functional architecture, as illustrated in FIG. 3. Various functional blocks or modules can be used for DASH services (e.g., over unicast/HTTP and MBMS/FLUTE transport methods).

For example, an IMS core network subsystem (IM CN subsystem) 120 can support user registration and authentication, mobility and roaming, control of multimedia sessions, quality of service (QoS) control, policy control, charging, and interworking with circuit switched network. The functions of the IM CN subsystem can be further described in 3GPP TS 23.228 V11.7.0 (2012 December).

The user equipment (UE) 110 (e.g., presentity or watcher UE) can contain the generic bootstrapping architecture (GBA), IMS, PSS, and/or MBMS clients, which can perform service discovery and selection, handle service initiation, modification and termination, and/or receive and present the content to the user.

An SCF 132 can provide service logic and functions to support the execution of service logic. For instance, the SCF can provide service authorization during session initiation and session modification, which can include checking the PSS and the MBMS user's service subscription in order to allow or deny access to the service. The SCF can select the relevant PSS and MBMS media functions. For HTTP-based delivery, the SCF can act as a proxy or back-to-back user agent (B2BUA). For MBMS, the SCF can act as a terminating user agent (UA).

An HTTP/SIP adapter 150 function can correlate a SIP session with HTTP incoming requests. The HTTP/SIP adapter can interface with the IM CN subsystem 120, the SCF 132, a HTTP server 160, and a presence server 130. The HTTP server can provide the DASH formatted content for the HTTP-based delivery. The functions of the HTTP server can be further described in 3GPP TS 26.247. As previously described, the presence server can accept, store, publish, and distribute presence information. In an example, the presence server can have the same interfaces as the SCF.

A BMSC.UPF 140 can include broadcast multicast service center (BMSC) user plane sub-functions (UPF). The BMSC.UPF can provide the DASH formatted content for the MBMS download. The BMSC.UPF (or BM-SC.UPF) can be in communication with and/or control a content provider/multicast broadcast source. The functions of the BMSC or BMSC.UPF can be further described in 3GPP TS 26.246 V11.3.0 (2012 December).

A policy and charging rules function (PCRF) 170 can control the charging and the establishment of resources in the RAN and packet-switched (PS) core network 180. The functions of the PCRF can be further described in 3GPP TS 23.203 V11.8.0 (2012 December).

A service selection function (SSF) 190 can provide a list of available PSS (including HTTP-based DASH) and MBMS user services and relevant user service description information. The SSF module can be personalized to the client's identity.

Figure 4:
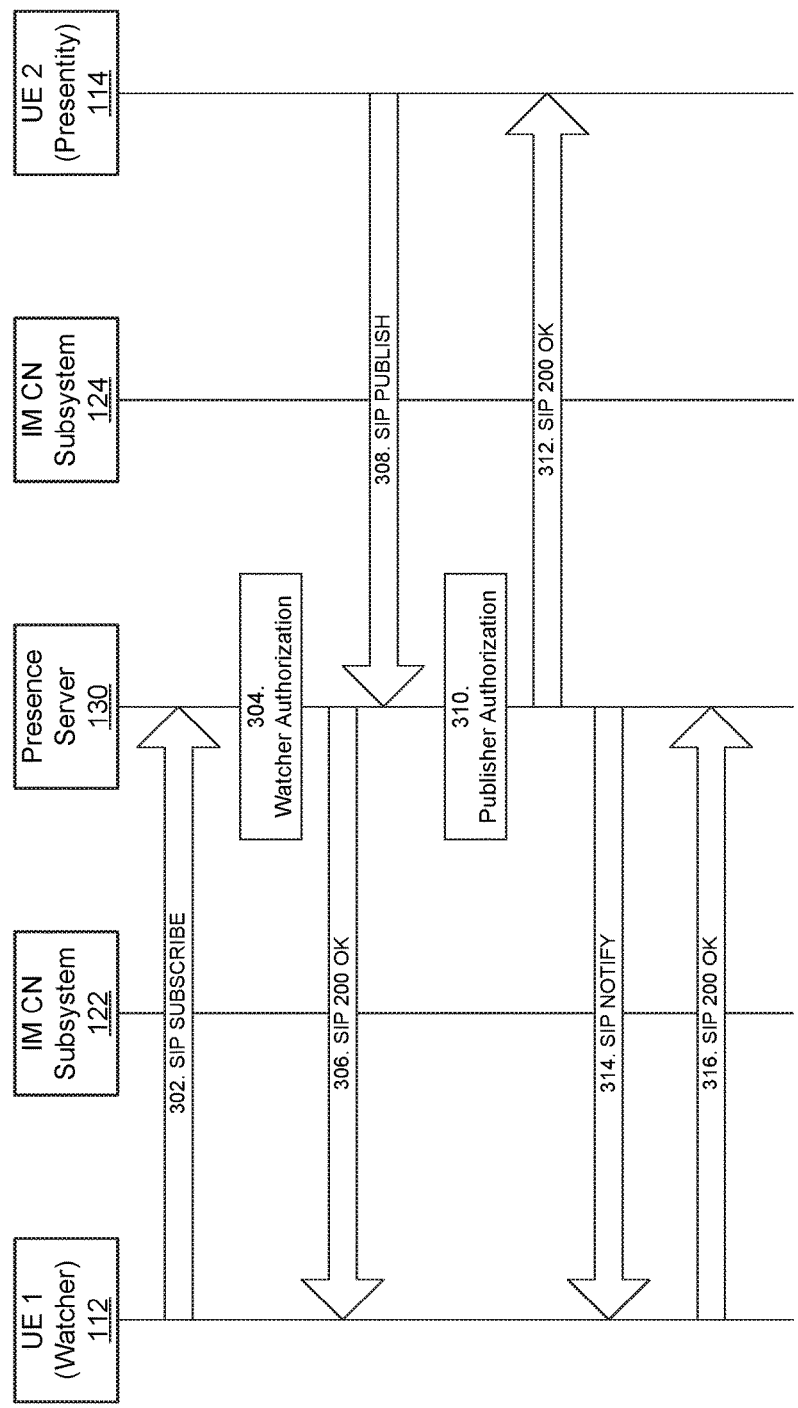
FIG. 4 illustrates an example of a message flow chart of a presence server used in Internet protocol (IP) multimedia subsystem (IMS) based dynamic adaptive streaming over hypertext transfer protocol (HTTP) (DASH) service in accordance with an example.

The presence server for an IMS based DASH service within the IMS based packet-switched streaming services (PSS) and MBMS user service functional architecture can combine IMS-based presence and DASH services. FIG. 4 illustrates a call flow for IMS-based presence service used in the context of DASH services. In this example, UE 1 112 can be a watcher and UE 2 114 can be a presentity. The UE 1 can communicate with the presence server 130 via an IM CN subsystem 122 and UE 2 can communicate with the presence server via an IM CN subsystem 124. In an example, the UE 2 can be in the UE 1's list of contacts. The UE 2 can request to publish the content that the user of UE 2 is currently watching.

The UE 1 112 can subscribe for presence information including a list of contacts, which can include the UE 2 114, by sending a SIP SUBSCRIBE message 302 to the presence server 130. The presence server can provide watcher authorization 304 and reply with a SIP 200 OK message 306.

After a trigger event, such as after initiating the DASH delivery or after a content switching over DASH, the UE 2 114 can determine to publish the content being consumed. The UE 2 can send a SIP publish message 308 to the presence server 130. The publish message can include additional attributes specific to DASH, such as the DASH content being consumed and the DASH media presentation description (MPD). The presence server can provide publisher authorization 310 and reply with a SIP 200 OK message 312.

On reception of the SIP publish message 308 and/or after publisher authorization 310, the presence server 130 can notify the UE 1 112 of the content being consumed (or viewed or published) by UE 2 114 by sending a SIP NOTIFY message 314. Upon successful reception of the SIP NOTIFY message, UE1 can respond with a SIP 200 OK message 316.

In another example, the UE acting as presentity (e.g., UE 2) may send a SIP PUBLISH on receipt of a final SIP 200 OK concerning an HTTP/unicast-based or MBMS/FLUTE-based DASH session initiation procedure (e.g., begin watching DASH content (i.e., movie A)). In another example, during the DASH session, the UE (e.g., UE 2) may also send a PUBLISH request after having performed content switching (e.g., switching from one DASH content (i.e., movie A using DASH) to another DASH content (i.e., movie B using DASH)). The trigger event messages (or trigger events) that can be used to publish content or send a SIP publish message can include: HTTP/unicast-based DASH content switching, MBMS/FLUTE-based DASH content switching, switching from HTTP/unicast to MBMS/FLUTE based content delivery, or switching from MBMS/FLUTE to HTTP/unicast-based content delivery.

In another example, the UE acting as presentity may send a SIP PUBLISH: on receipt of a final SIP 200 OK concerning a PSS streaming session initiation procedure (or SIP), on receipt of a final SIP 200 OK concerning a MBMS streaming session initiation procedure, on receipt of a final SIP 200 OK concerning a third generation partnership project (3GPP) file format-DASH (3GP-DASH) session initiation procedure, or on receipt of a final SIP 200 OK concerning a MBMS download session initiation procedure.

During a streaming session (including DASH-formatted content delivery), the UE may also send a PUBLISH request after having performed content switching, which can include: PSS content switching (for both PSS streaming and 3GP-DASH services), MBMS content switching (for both MBMS streaming and MBMS download services), switching from PSS to MBMS streaming with a channel change (e.g., different DASH content), switching from MBMS to PSS streaming with channel change, switching from 3GP-DASH to MBMS download service with channel change, or switching from MBMS download to 3GP-DASH service with channel change.

The content of the PUBLISH may be set as follows: the request-URI, the To (e.g., receiver) and the From (e.g., sender) headers may be set to the public user identity of the user; the Event header may be set to the "presence" event package, the content type may be set to "application/pidf+xml". A uniform resource identifier (URI) can include a URL or a uniform resource name (URN).

Additional elements specific to DASH services may also be included SIP PUBLISH message. For instance, in case of a live DASH service (based on HTTP/unicast or MBMS/FLUTE), the specific additional elements can include the live television (TV) channel and/or event currently being watched, and the information on the live content or current TV program. In case of an on-demand service, the specific additional element can include the on-demand content. In an example, an XML schema may be used when the presence documents or presence information are published by the UE.

The UE acting as a watcher (e.g., UE 1) may then receive a SIP NOTIFY message including the information on the content consumed by the UE acting as the presentity (e.g., UE 2), which content may include the DASH MPD file.

Figure 5:
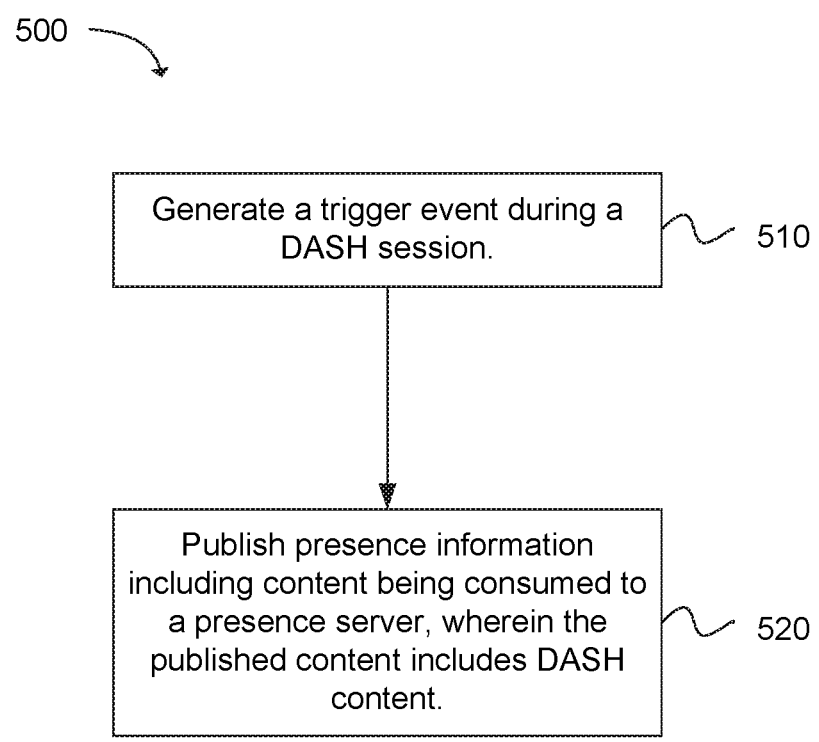
FIG. 5 depicts functionality of computer circuitry of a user equipment (UE) operable to act as a presentity in an Internet protocol (IP) multimedia subsystem (IMS) based dynamic adaptive streaming over hypertext transfer protocol (HTTP) (DASH) service in accordance with an example.

Another example provides functionality 500 of computer circuitry of a user equipment (UE) operable to act as a presentity in an Internet protocol (IP) multimedia subsystem (IMS) based dynamic adaptive streaming over hypertext transfer protocol (HTTP) (DASH) service, as shown in the flow chart in FIG. 5. The functionality may be implemented as a method or the functionality may be executed as instructions on a machine, where the instructions are included on at least one computer readable medium or one non-transitory machine readable storage medium. The computer circuitry can be configured to generate a trigger event during a DASH session, as in block 510. The computer circuitry can be further configured to publish presence information including content being consumed to a presence server, wherein the published content includes DASH content, as in block 520.

The DASH content can include a DASH attribute, a media presentation description (MPD) metadata file, or a DASH segment. In an example, the trigger event can include: a third generation partnership project (3GPP) file format-DASH (3GP-DASH) session initiation procedure, a multimedia broadcast multicast services (MBMS) download session initiation procedure, a switch from a 3GP-DASH service to a MBMS download service with a channel change, or a switch from a MBMS download service to a 3GP-DASH service with a channel change. In another example, the trigger event can include: a switch between HTTP or unicast-based DASH content, a switch between MBMS or file delivery over unidirectional transport-based (FLUTE-based) DASH content, a switch from HTTP or unicast-based content delivery to MBMS or FLUTE-based content delivery, or a switch from MBMS or FLUTE-based content delivery to HTTP or unicast-based content delivery.

In another configuration, the computer circuitry configured to publish the presence information can be further configured to send a session initiation protocol (SIP) PUBLISH message to the presence server with the DASH content. In another example, the computer circuitry configured can be further: receive the DASH content via a DASH service; and receive an acknowledgement from the presence server authorizing the UE to publish the DASH content. The acknowledgement can include a session initiation protocol (SIP) 200 OK message. In another configuration, the computer circuitry configured to publish the presence information can be further configured to send the presence information to the presence server via a session initiation protocol (SIP) or an extensible markup language (XML) configuration access protocol (XCAP). The presence information can include geolocation, service capabilities, content consumption, taglines, or avatars. The UE can include an antenna, a camera, a touch sensitive display screen, a speaker, a microphone, a graphics processor, an application processor, internal memory, or a non-volatile memory port.

Figure 6:
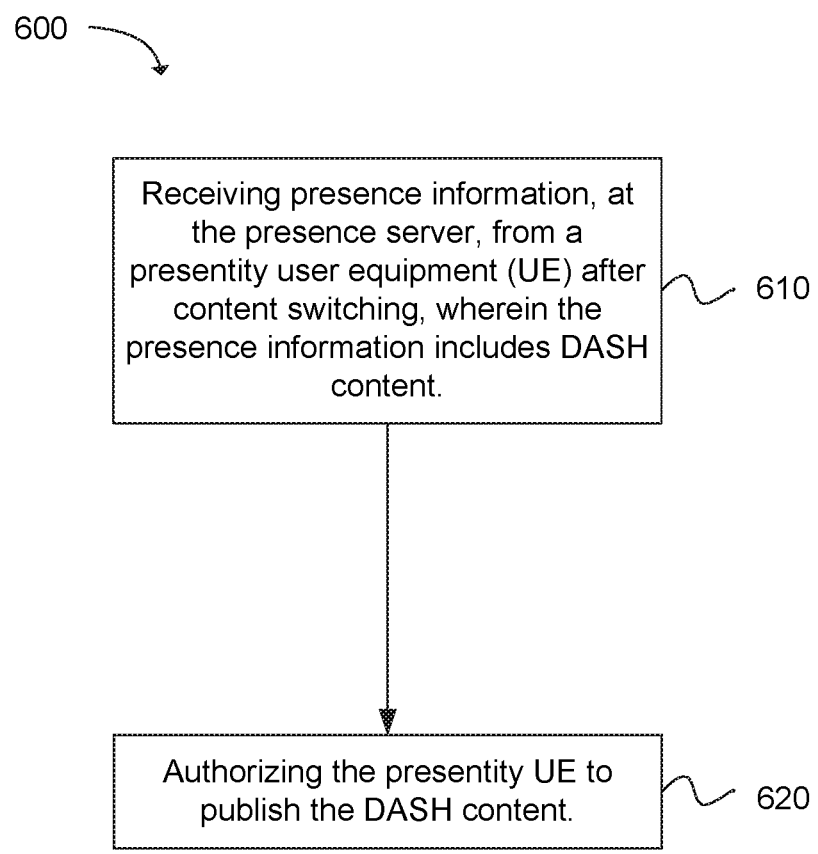
FIG. 6 depicts a flow chart of a method for distributing presence information by a presence server in an Internet protocol (IP) multimedia subsystem (IMS) based dynamic adaptive streaming over hypertext transfer protocol (HTTP) (DASH) service in accordance with an example.

Another example provides a method 600 for distributing presence information by a presence server in an Internet protocol (IP) multimedia subsystem (IMS) based dynamic adaptive streaming over hypertext transfer protocol (HTTP) (DASH) service, as shown in the flow chart in FIG. 6. The method may be executed as instructions on a machine or computer circuitry, where the instructions are included on at least one computer readable medium or one non-transitory machine readable storage medium. The method includes the operation of receiving presence information, at the presence server, from a presentity user equipment (UE) after content switching, wherein the presence information includes DASH content, as in block 610. The next operation of the method can be authorizing the presentity UE to publish the DASH content, as in block 620.

In an example, the method can further include: sending an acknowledgement to the presentity UE indicating that the presentity UE is authorized to publish the DASH content. The DASH content can include a DASH attribute, a media presentation description (MPD) metadata file, or a DASH segment. In another example, the content switching can include: a third generation partnership project (3GPP) file format-DASH (3GP-DASH) session initiation procedure for the presentity UE, a multimedia broadcast multicast services (MBMS) download session initiation procedure for the presentity UE, a switch from a 3GP-DASH service to a MBMS download service with a channel change by the presentity UE, or a switch from a MBMS download service to a 3GP-DASH service with a channel change by the presentity UE. In another configuration, the content switching can include: a switch between HTTP or unicast-based DASH content by the presentity UE, a switch between MBMS or file delivery over unidirectional transport-based (FLUTE-based) DASH content by the presentity UE, a switch from HTTP or unicast-based content delivery to MBMS or FLUTE-based content delivery by the presentity UE, or a switch from MBMS or FLUTE-based content delivery to HTTP or unicast-based content delivery by the presentity UE.

In another example, the operation of receiving the presence information can further include: receiving presence information via a session initiation protocol (SIP) or an extensible markup language (XML) configuration access protocol (XCAP); storing the presence information; publishing the presence information; or distributing the presence information. The presence information can include geolocation, service capabilities, content consumption, taglines, or avatars. In another configuration, the method can further include: receiving a subscribe message from a watcher UE; authorizing the watcher UE to receive the DASH content; and sending an acknowledgement to the watcher UE indicating that the watcher UE is authorized to receive the DASH content. In another example, the method can further include: sending a notify message to a watcher UE indicating the presence information of the presentity UE; or publishing the presence information to the watcher UE including DASH content to the watcher UE. In another configuration, the operation of receiving the presence information can further include receiving a publish message including a sender header and a receiver header set to a public user identity of the presentity UE, an event header set to a presence event package, a content type set to application/pidf+xml, a live television (TV) channel or event watched, live content information, a current TV program, or on-demand content.

Figure 7:
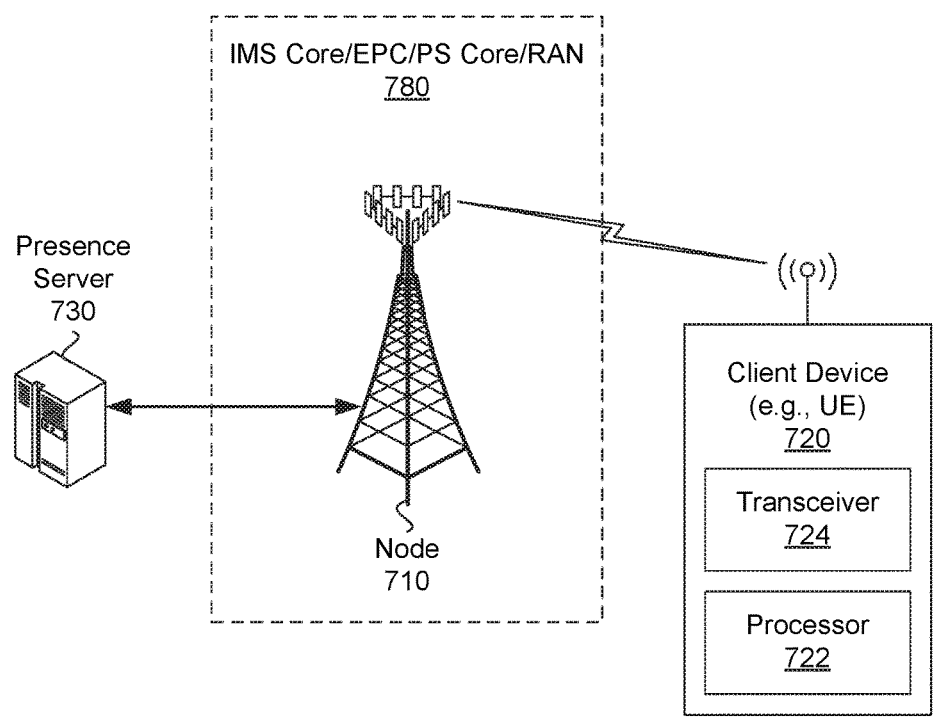
FIG. 7 illustrates a diagram of a presence server, a node (e.g., eNB), and a user equipment (UE) in accordance with an example.

FIG. 7 illustrates an example user equipment (UE) 720, a node 710 in a IMS core, EPC, PS core, and/or RAN 780, and a presence server 730 for distributing presence information in an IMS based DASH service. The UE can operate as a watcher or a presentity. For example, the UE can be operable to act as a presentity in an IMS based DASH service, as described in 500 of FIG. 5. In another configuration, the presence server can be configured for distributing presence information in an IMS based DASH service, as described in 600 of FIG. 6. In an example, the UE can communicate with the presence server via the node. The node 710 can include a base station (BS), a Node B (NB), an evolved Node B (eNB), a baseband unit (BBU), a remote radio head (RRH), a remote radio equipment (RRE), a remote radio unit (RRU), or a central processing module (CPM).

The client device 720 can include a processor 722 and a transceiver 724. The UE can be configured for receiving presence information (e.g., watcher) via the presence server 730 in an IMS based DASH service. The transceiver can be configured to receive a notify message from a presence server indicating the presence information of a presentity UE after content switching by the presentity UE. The presence information can include DASH content. The processor can be configured to view or process the DASH content from the presentity UE via the presence server. The DASH content can include a DASH attribute, a media presentation description (MPD) metadata file, or a DASH segment. In an example, the content switching can include: initiating a third generation partnership project (3GPP) file format-DASH (3GP-DASH) session initiation procedure, initiating a multimedia broadcast multicast services (MBMS) download session initiation procedure, switching from a 3GP-DASH service to a MBMS download service with a channel change, or switching from a MBMS download service to a 3GP-DASH service with a channel change. In another example, the content switching can include: switching between HTTP or unicast-based DASH content, switching between MBMS or file delivery over unidirectional transport-based (FLUTE-based) DASH content, switching from HTTP or unicast-based content delivery to MBMS or FLUTE-based content delivery, or switching from MBMS or FLUTE-based content delivery to HTTP or unicast-based content delivery.

In another configuration, the UE can be configured as a presentity. The processor can be further configured to: perform content switching during a DASH session. The transceiver can be further configured to publish presence information including content being consumed to the presence server. The published content can include DASH content. In another example, the transceiver can be further configured to send the presence information to the presence server via a session initiation protocol (SIP) or an extensible markup language (XML) configuration access protocol (XCAP). The presence information can include geolocation, service capabilities, content consumption, taglines, or avatars.

Figure 8:
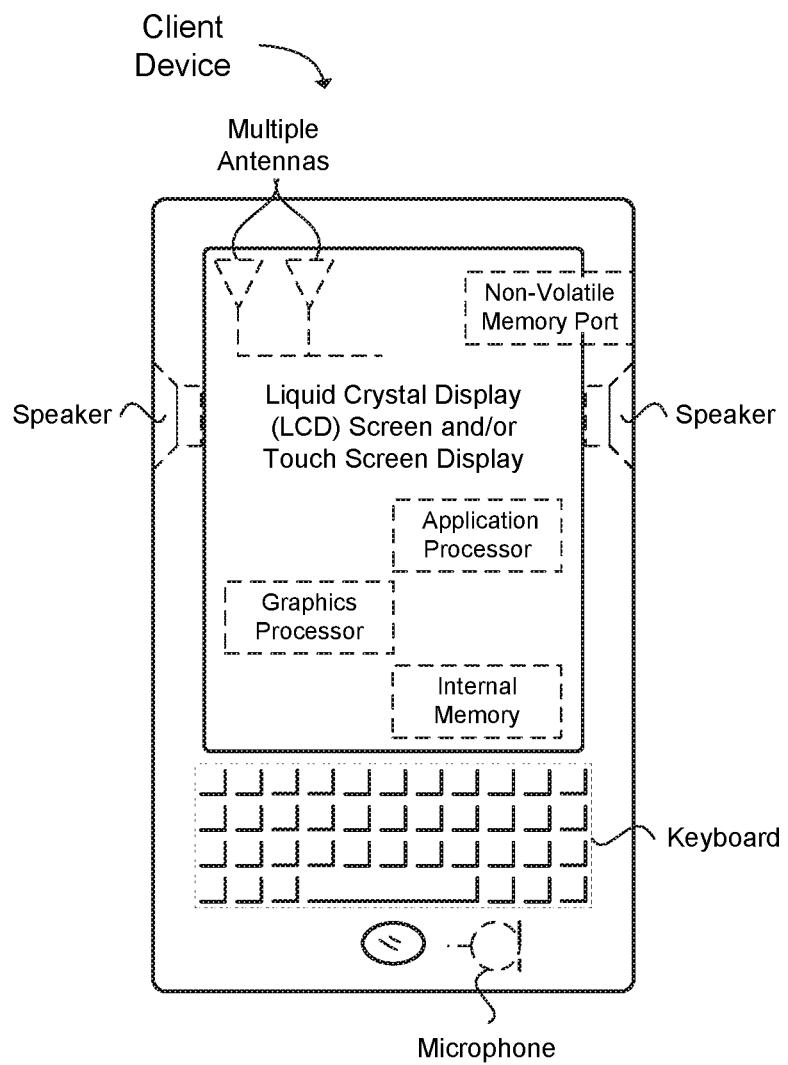
FIG. 8 illustrates a diagram of a wireless device (e.g., UE) in accordance with an example.

FIG. 8 provides an example illustration of the user equipment (UE), such as a mobile terminal (MT), a mobile node, a client device, a mobile station (MS), a mobile wireless device, a mobile communication device, a tablet, a handset, or other type of wireless device. The UE can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the UE. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defecto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE) operable to act as a presentity for Internet protocol (IP) multimedia subsystem (IMS) based packet-switched streaming services (PSS) or multimedia broadcast and multicast services (MBMS), the apparatus comprising:
   one or more processors configured to:
   initiate, at the UE, an IMS based PSS session or MBMS session or content switching between IMS based content;
   determine, at the UE, based on initiation of the IMS based PSS session or MBMS session or the content switching between IMS based content, to send a session initiation protocol (SIP) PUBLISH message to a presence server to publish content being consumed at the UE, wherein a determination to send the SIP PUBLISH message to the presence server is based on receiving a SIP OK message concerning a selected session initiation procedure, wherein the selected session initiation procedure is one of a third generation partnership project (3GPP) file format (3GP)-dynamic adaptive streaming over hypertext transfer protocol (HTTP) (3GP-DASH) session initiation procedure or an MBMS download session initiation procedure;
   encode, at the UE, the SIP PUBLISH message for transmission to the presence server, wherein the SIP PUBLISH message includes an indication of content being consumed at the UE; and
   decode, at the UE, a SIP OK message received from the presence server, wherein the SIP OK message is an acknowledgement of the SIP PUBLISH message received at the presence server from the UE;
   wherein the one or more processors are configured to determine to send the SIP PUBLISH message to the presence server after performing content switching between IMS based content, wherein the content switching includes one of:
   a switching from a third generation partnership project (3GPP) file format dynamic adaptive streaming over hypertext transfer protocol (HTTP) (3GP-DASH) to an MBMS download service with a channel change; or
   a switching from an MBMS download to a 3GP-DASH service with a channel change; and
   memory configured to store the indication of content being consumed at the UE.

2. The apparatus of claim 1, further comprising a transceiver configured to:
   transmit the SIP PUBLISH message to the presence server; and
   receive the SIP OK message from the presence server.

3. The apparatus of claim 1, wherein the one or more processors are configured to:
   encode the SIP PUBLISH message for transmission to the presence server via an IMS core network subsystem (IM CN subsystem); and
   decode the SIP OK message received from the presence server via the IM CN subsystem.

4. The apparatus of claim 1, wherein the content being consumed at the UE is on-demand content currently being consumed at the UE.

5. The apparatus of claim 1, wherein the indication of content being consumed at the UE in the SIP PUBLISH message is in accordance with an extensible markup language (XML) schema.

6. An apparatus of a presence server utilized for Internet protocol (IP) multimedia subsystem (IMS) based packet-switched streaming services (PSS) or multimedia broadcast and multicast services (MBMS), the apparatus comprising:
   one or more processors configured to:
   decode, at the presence server, a session initiation protocol (SIP) SUBSCRIBE message received from a user equipment (UE) acting as a watcher, wherein SIP SUBCRIBE message enables the UE acting as the watcher to subscribe for presence information for a list of contacts which includes a UE acting as a presentity;
   decode, at the presence server, a SIP PUBLISH message received from the UE acting as the presentity, wherein the SIP PUBLISH message includes an indication of content being consumed at the UE acting as the presentity, wherein the SIP PUBLISH message received from the UE acting as the presentity is decoded after a content switching between IMS based content is performed at the UE acting as the presentity, wherein the content switching includes one of a switching from a third generation partnership project (3GPP) file format dynamic adaptive streaming over hypertext transfer protocol (HTTP) (3GP-DASH) to an MBMS download service with a channel change or a switching from an MBMS download to a 3GP-DASH service with a channel change; and
   encode, at the presence server, a SIP NOTIFY message for transmission to the UE acting as the watcher, wherein the SIP NOTIFY message includes the indication of content being consumed at the UE acting as the presentity; and
   memory configured to store the indication of content being consumed at the UE acting as the presentity.

7. The apparatus of claim 6, further comprising a transceiver configured to:
   receive the SIP SUBSCRIBE message from the UE acting as the watcher;
   receive the SIP PUBLISH message from the UE acting as the presentity; and
   encode the SIP NOTIFY message for transmission to the UE acting as the watcher.

8. The apparatus of claim 6, wherein the one or more processors are configured to decode the SIP PUBLISH message received from the UE acting as the presentity after sending a SIP OK message to the UE acting as the presentity concerning one of:
   a third generation partnership project (3GPP) file format dynamic adaptive streaming over hypertext transfer protocol (HTTP) (3GP-DASH) session initiation procedure; or
   an MBMS download session initiation procedure.

9. The apparatus of claim 6, wherein the one or more processors are configured to:
- decode the SIP SUBSCRIBE message received from the UE acting as the watcher via an IMS core network subsystem (IM CN subsystem); and
- decode the SIP PUBLISH message received from the UE acting as the presentity via the IM CN subsystem.

10. The apparatus of claim 6, wherein the one or more processors are configured to encode the SIP NOTIFY message for transmission to the UE acting as the watcher via the IM CN subsystem.

11. At least one non-transitory machine readable storage medium having instructions embodied thereon for providing Internet protocol (IP) multimedia subsystem (IMS) based packet-switched streaming services (PSS) or multimedia broadcast and multicast services (MBMS) to a user equipment (UE) acting as a presentity, the instructions when executed perform the following:
- determining, at the UE, based on an initiation of an IMS based PSS session or MBMS session or content switching between IMS based content, to send a session initiation protocol (SIP) PUBLISH message to a presence server to publish content being consumed at the UE, wherein a determination to send the SIP PUBLISH message to the presence server is based on receiving a SIP OK message concerning a selected session initiation procedure, wherein the selected session initiation procedure is one of a third generation partnership project (3GPP) file format (3GP)-dynamic adaptive streaming over hypertext transfer protocol (HTTP) (3GP-DASH) session initiation procedure or an MBMS download session initiation procedure;
- encoding, at the UE, the SIP PUBLISH message for transmission to the presence server, wherein the SIP PUBLISH message includes an indication of content being consumed at the UE;
- decoding, at the UE, a SIP OK message received from the presence server, wherein the SIP OK message is an acknowledgement of the SIP PUBLISH message received at the presence server from the UE; and
- determining to send the SIP PUBLISH message to the presence server after performing the content switching, wherein the content switching includes one of:
  - a switching from a third generation partnership project (3GPP) file format dynamic adaptive streaming over hypertext transfer protocol (HTTP) (3GP-DASH) to an MBMS download service with a channel change; or
  - a switching from an MBMS download to a 3GP-DASH service with a channel change.

12. The at least one non-transitory machine readable storage medium of claim 11, further comprising instructions when executed perform the following:
- encoding the SIP PUBLISH message for transmission to the presence server via an IMS core network subsystem (IM CN subsystem); and
- decoding the SIP OK message received from the presence server via the IM CN subsystem.

13. The at least one non-transitory machine readable storage medium of claim 11, wherein the content being consumed at the UE is on-demand content currently being consumed at the UE.

14. The at least one non-transitory machine readable storage medium of claim 11, wherein the indication of content being consumed at the UE acting as the presentity in the SIP PUBLISH message is in accordance with an extensible markup language (XML) schema.

15. At least one non-transitory machine readable storage medium having instructions embodied thereon for providing Internet protocol (IP) multimedia subsystem (IMS) based packet-switched streaming services (PSS) or multimedia broadcast and multicast services (MBMS) from a presence server, the instructions when executed perform the following:
- decoding, at the presence server, a session initiation protocol (SIP) SUBSCRIBE message received from a user equipment (UE) acting as a watcher, wherein SIP SUBCRIBE message enables the UE acting as the watcher to subscribe for presence information for a list of contacts which includes a UE acting as a presentity;
- decoding, at the presence server, a SIP PUBLISH message received from the UE acting as the presentity, wherein the SIP PUBLISH message includes an indication of content being consumed at the UE acting as the presentity, wherein the SIP PUBLISH message received from the UE acting as the presentity is decoded after a content switching between IMS based content is performed at the UE acting as the presentity, wherein the content switching includes one of a switching from a third generation partnership project (3GPP) file format dynamic adaptive streaming over hypertext transfer protocol (HTTP) (3GP-DASH) to an MBMS download service with a channel change or a switching from an MBMS download to a 3GP-DASH service with a channel change; and
- encoding, at the presence server, a SIP NOTIFY message for transmission to the UE acting as the watcher, wherein the SIP NOTIFY message includes the indication of content being consumed at the UE acting as the presentity.

16. The at least one non-transitory machine readable storage medium of claim 15, further comprising instructions when executed perform the following: decoding the SIP PUBLISH message received from the UE acting as the presentity after a content switching is performed at the UE acting as the presentity, wherein the content switching includes one of:
- a switching from a third generation partnership project (3GPP) file format dynamic adaptive streaming over hypertext transfer protocol (HTTP) (3GP-DASH) to an MBMS download service with a channel change; or
- a switching from an MBMS download to a 3GP-DASH service with a channel change.

17. The at least one non-transitory machine readable storage medium of claim 15, further comprising instructions when executed perform the following:
- decoding the SIP SUBSCRIBE message received from the UE acting as the watcher via an IMS core network subsystem (IM CN subsystem); and
- decoding the SIP PUBLISH message received from the UE acting as the presentity via the IM CN subsystem.

18. The at least one non-transitory machine readable storage medium of claim 15, further comprising instructions when executed perform the following: encoding the SIP NOTIFY message for transmission to the UE acting as the watcher via the IM CN subsystem.

* * * * *